United States Patent
Mao

(10) Patent No.: US 6,728,965 B1
(45) Date of Patent: Apr. 27, 2004

(54) CHANNEL CHANGER FOR USE IN A SWITCHED DIGITAL VIDEO SYSTEM

(75) Inventor: Weidong Mao, Princeton, NJ (US)

(73) Assignee: Next Level Communications, Inc., Rohnert Park, CA (US)

( * ) Notice: Subject to any disclaimer, the term of this patent is extended or adjusted under 35 U.S.C. 154(b) by 0 days.

(21) Appl. No.: 08/915,467

(22) Filed: Aug. 20, 1997

(51) Int. Cl.⁷ .............. H04N 5/445; G06F 3/00; G06F 13/00; H04S 5/268
(52) U.S. Cl. .............. 725/38; 348/705; 348/526
(58) Field of Search ............ 395/200.47, 200.48, 395/200.49, 200.17; 348/6, 12, 13, 10, 513, 523, 525, 526, 731, 705; 455/3.1, 4.2, 5.1, 6.2, 5.6; 370/422, 477, 509, 510; 725/125, 105, 116; H04N 1/00, 3/00, 5/445, 5/266; G06F 3/00, 13/00

(56) References Cited

U.S. PATENT DOCUMENTS

| | | | |
|---|---|---|---|
| 5,422,674 A | * 6/1995 | Hooper et al. | 348/6 |
| 5,629,732 A | 5/1997 | Moskowitz et al. | 348/7 |
| 5,659,539 A | * 8/1997 | Porter et al. | 348/13 |
| 5,720,037 A | * 2/1998 | Biliris et al. | 348/6 |
| 5,724,091 A | * 3/1998 | Freeman et al. | 725/138 |
| 5,732,217 A | * 3/1998 | Emura | 395/200.49 |
| 5,742,347 A | * 4/1998 | Kandlur et al. | 348/13 |
| 5,933,192 A | * 8/1999 | Crosby et al. | 348/387 |

* cited by examiner

*Primary Examiner*—Vivek Srivastava
(74) *Attorney, Agent, or Firm*—Covington & Burling

(57) ABSTRACT

A rapid channel changer for use in a digital broadband access system. The subject rapid channel changer includes a cache buffer for storing the video data and a processor for detecting and pointing to the synchronization frames. When a subscriber's channel change request is received by the processing unit, the corresponding video signal can be quickly accessed and directed downstream to the subscriber, since the processor can immediately synchronize the video data without having to wait for the next synchronization frame.

12 Claims, 4 Drawing Sheets

Typical ATM Cell

CHANNEL CHANGER FOR USE IN A SWITCHED DIGITAL VIDEO SYSTEM

FIELD OF THE INVENTION

The present invention relates generally to an apparatus for the distribution and delivery of video in a digital system and, in particular, to a method and apparatus that rapidly changes the channel in such a system.

BACKGROUND OF THE INVENTION

In a typical analog cable system all of the channels or services ordered by the subscriber are delivered to each subscriber's home. In order to ensure that each subscriber receives only the channels for which he has paid, the cable television providers encrypt or "scramble" the premium channels (HBO, CINEMAX, DISNEY, etc.). The cable television providers also may scramble many of the "basic" channels (local stations, ESPN, MTV, VH1, TNT, DISCOVERY, etc.). Therefore, even though virtually all television sets sold today are cable-ready, most subscribers still need a set-top unit (sometimes referred to as a cable box in the cable television environment) to descramble the signals. The set-top units are located proximate a television and are also used to change the channel that is viewed on the television.

Subscribers, especially residential subscribers, are demanding that large amounts of information and more choices of services be brought into their homes. Switched video for viewing on a subscriber's television and high-speed Internet access are two services highly desired by subscribers. In order to meet the demand, and to accommodate the recently approved high-definition television standards, the new services will likely have to be capable of handling digital signals.

In addition to the emerging technologies, entry of the Regional Bell Operating Companies (RBOCs) have made digital delivery systems economically feasible. A typical digital video delivery system includes a means for receiving the video signals from various broadcast sources, a means for delivering the signals to a plurality of subscribers, and a means of transmitting the signals between the receiving means and delivering means. The means for receiving the video signals may include a broadband digital terminal (BDT) located in a central office. The delivering means may be a broadband network unit (BNU) located preferably on a telephone pole or other convenient location proximate a number of subscribers. Cable or optical fiber connects the BDT to the BNU. A second cable (or a twisted wire pair) connects the set-top units (and, if required, the various other units in the subscriber's home) with the BNU.

In a typical digital video system, all of the video services offered by the video service company are again delivered to the set-top unit. When selecting a new channel, the set-top unit performs the actual switching and also descrambles the digital signals.

Even though the premium channels are scrambled, delivering all of the video signals into a subscriber's home makes the video services susceptible to theft. Accordingly, more complex—and expensive—steps must be taken to further secure the transmission and delivery of the video services.

A solution to the theft problem is to perform the channel switching "upstream" from the subscriber at a facility controlled by the video provider (in a digital system at the BDT, for, example), and only delivering one channel at a time to the subscriber's set-top unit. Another advantage of moving the switching upstream is that the bandwidth requirements of the overall video delivery system are greatly reduced. However, a drawback of this system is that the subscriber experiences a time delay between the period of time it takes for the subscriber to select a channel and for the newly selected channel to be viewed on the television.

The reason for this time delay is that the subscriber's request must first travel upstream to the BDT; next, the BDT must acknowledge the request, then synchronize and "lock on" to the desired video service; finally, the BDT must transmit the desired video service back downstream to the subscriber. The overall delay between each channel change can take over a second.

A significant portion of the delay is caused by the time it takes for the video signal to synchronize. This portion accounts for about half of the overall delay (i.e., about a half second). Many subscribers find the delay in such video delivery systems annoying since they are accustomed to seeing the broadcast signal immediately after selecting a new channel. Most subscribers find that a one second delay is unacceptable, which would make such a system competitively unattractive.

SUMMARY OF THE INVENTION

The present invention relates to a method and apparatus for rapidly changing the channel in a digital video delivery system. The rapid channel changer will be preferably located in the central office with the broadband digital terminal (BDT) and indexes the "start" or synchronization frame of each video channel received at the BDT.

Each digital video signal includes a synchronization frame. The subject channel changer captures the multiple compressed video signals and stores each signal in a cache buffer. A, processor is used to index or "point to" the respective synchronization frames for each buffered signal.

When a subscriber requests a specific channel or video service, the processor can immediately access the requested video signal at a synchronization frame and direct the video stream to the subscriber since the processor already has the position of the synchronization frame of each video signal. Accordingly, the period of time that the subscriber previously had to wait for the synchronization frame is eliminated.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION A PREFERRED EMBODIMENT

Figure 1:
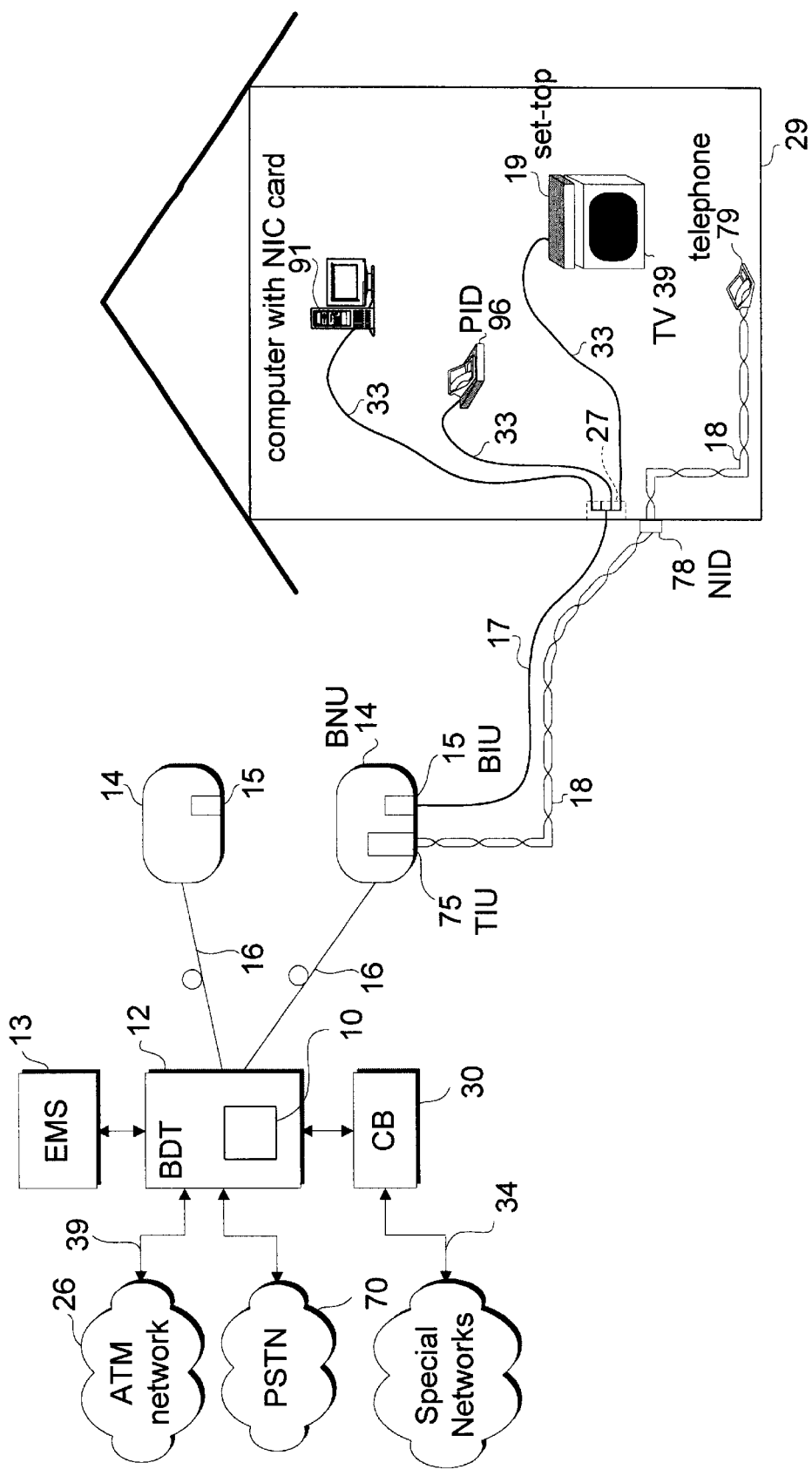
FIG. 1 illustrates generally a broadband access system, capable of delivering video, data and voice information.

In describing a preferred embodiment of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

With reference to the drawings, in general, and FIGS. 1 through 7 in particular, the apparatus of the present invention is disclosed.

As shown in FIG. 1, a broadband access system for delivery of video, data (for a computer network interface) and telephony services is shown. Although techniques disclosed herein may be used in connection with other services/technologies, the preferred embodiment will be discussed in connection with the delivery and distribution of digital video signals. Components used for these other services are not needed to understand the subject invention, and are only described to the extent their presence may be pertinent to the understanding of the subject invention.

This invention relates to a rapid channel changer, generally indicated at 10, for use in a digital broadband access system. The digital broadband access system typically includes a broadband digital terminal (BDT) 12 connected to a broadband network unit (BNU) 14.

The BDT 12 can be equipped with an element management system (EMS) 13 that provisions services and equipment, and for handling certain video signal controls on the digital broadband access system. The EMS 13 is usually software based and can be implemented on either a personal computer or a workstation. A personal computer based EMS can support one BDT 12 and its associated broad access network equipment. A workstation can support multiple BDT's 12 and their respective access network equipment.

In a preferred embodiment, video programming is primarily input to the broadband access system via an Asynchronous Transfer Mode (ATM) network 26 connected to the BDT 12. The BDT 12, through communication with a Channel Bank (CB) 30 can also receive special services signals from private networks or non-switched public networks 32 for transmission through the broadband access system via a connection with a special networks-CB interface 34. The CB 30 is connected to the BDT 12 allowing customers to order programming from the special private or public networks.

The interface to the ATM network-BDT interface 39 can be realized using an OC-3 or OC-12 optical interfaces carrying ATM cells. In a preferred embodiment, BDT 12 has two OC-12c broadcast ports, which can only receive signals carrying ATM cells, and one OC-12c interactive port which can receive an d transmit signals.

For the purpose of illustration, the BDT 12 can also be connected to the Public Switched Telecommunications Network (PSTN) 70. The physical interface to the PSTN is twisted wire pairs supporting the transmission of DS-1 signals, or optical fiber supporting the transmission of OC-3 optical signals.

The BDT 12 is typically located in a facility owned by the video/data service provider, for example, the central office of a Regional Bell Operating Company. The BNU 14 is located in the serving area usually on a telephone pole (i.e., at the "curb") proximate the houses 29 of the subscribers. The preferred connection between the BDT 12 and BNU 14 is made with an optical fiber cable 16 and is sometimes called a fiber-to-the-curb:(FTTC) architecture.

The FTTC architecture is an outgrowth of Digital Loop Carrier (DLC) technology which was developed in the early 1970's to provide telephone service to areas remotely located from a telephone company's central office. Capable of utilizing digital switching, the FTTC architecture has the advantage of being compatible with both isochronous telephone network and packet/cell based network and is thus well suited for providing Internet access and Switched Digital Video (SDV).

In the preferred embodiment, the optical fiber 16 is a single-mode fiber and a dual wavelength transmission scheme is used to transmit signals between BDT 12 and BNU 14. Digital signals pass back and forth between BDT 12 and BNU 14 at a rate of 155 Mb/s utilizing Synchronous Digital Hierarchy (SDH).

The BDT 12 can be connected to scores of BNU's, but the actual number depends on the services offered and the number of subscribers being served. In a preferred embodiment, up to sixty-four BNU's are served by each BDT 12.

Each BNU 14 has multiple drops for serving a plurality of subscribers. Typically, each BNU 14 can serve sixteen subscribers' houses 29. The drops for delivering video services are preferably coaxial cable 17. (Although optical fiber may be used to deliver the video signals from the BIU 15 to each subscriber's house 29, the preferred connection is made with coaxial cable 17 for economic reasons.)

Since many of the devices presently in use by the subscriber accept only analog signals, a broadband interface unit (BIU) 15 is needed to convert the digital signals delivered to the BNU 14 by the optical fiber cable 16 into analog signals. The broadband interface unit 15 is located within BNU 14 and generates broadband signals which contain video, data and voice information. The BIU 15 ultimately communicates with various devices inside the subscriber's house 29. These may include Premises Interface Devices 96, Network Interface Cards 91 and television set-top units 19. BIU 15 modulates data onto an RF carrier and transmits the data over the coaxial drop cable 17.

The BIU 15 is connected to the set-top unit 19, either directly or through a splitter 27 as shown in FIG. 1. The splitter 27 is used when the broadband access system is utilized to deliver other services (e.g., high speed Internet access and/or telephony), in addition to video, to the subscriber or to provide signals to multiple set-top units. The connection between splitter 27 and the various devices within the subscriber's home 29 is preferably made with an in-home coaxial wiring 33. In alternate embodiments, an interface subsystem, including an active device sometimes referred to as a "residential gateway" (in contrast to the passive splitter 27), may be used to control and direct the various services within the subscriber's home 29, and to convert signals received from BIU 15 to the appropriate format required by each device.

In-home coaxial wiring 33 connects set-top unit 19 with splitter 27. The set-top unit 19 is connected to a television 39 in the normal manner. If the signals generated by BIU 15 are still not compatible with a specific television unit 39, the set-top 19 may include additional circuitry that converts the video signals from the BIU to signals compatible with any television 39 present in the home 29.

The BNU 14 may contain a Telephone Interface Unit (TIU) 75 which generates an analog Plain Old Telephony (POT) signal. A twisted wire pair drop 18 is shown in FIG. 1 for delivering traditional narrowband Plain Old Telephony (POT) service to all subscribers. The subscriber's telephone 79 is preferably connected to the TIU 75 through a Network Interface Device NID 8. If the deployment scenario is such that construction considerations prohibit the installation of coaxial cable drops 17, the relatively recent developments in transmission line technologies (e.g., High Speed Digital Subscriber Line, Asymmetric Digital Subscriber Line, and Very High Rate Digital Subscriber Line, sometimes each is referred to as xDSL technologies) allow high speed services to be delivered over the twisted wire pair 18.

In most video access systems (especially in analog systems that are commonly used today), all of the channels and services requested by the subscriber are simultaneously delivered to a cable box (i.e., a type of set-top unit used by cable TV service providers). When the subscriber wants to change the channel on the television 39, the subscriber accesses the cable box/set-top unit. The cable box actually performs the channel changing and decryption of the incoming video signals.

Most video access systems (including the newer digital systems that have more recently been developed and deployed) still simultaneously deliver all or most of the channels to a set-top unit in a subscriber's home. Generally speaking, these newer set top units require more complex circuitry than the older cable boxes. Part of the reason is that newer systems are designed to handle more channels and to perform more complex decryption of a signal in order to reduce theft.

In the present invention, the actual changing of the channel is performed by circuitry 10 within the BDT 12 or BNU 14, and only one or two video channels at a time are typically delivered to the subscriber's set top unit 19. This reduces the complexity and the cost of the subscriber's set-top unit 19. More importantly, since the video service provider controls the delivery of the video signal at a point upstream from the subscriber, it reduces the possibility that the subscriber can tamper with the system and reduces theft of services. This, in turn, eliminates the need for encryption of the video signal and further reduces the complexity of set-top units.

By locating the channel changing circuitry at a distance away from the subscriber's television, the subscriber experiences a delay in time between each channel change on his television. As the following example will show, in which the subscriber changes the channel viewed on television set 39 to channel X, an unacceptable delay may be caused.

Figure 2A:
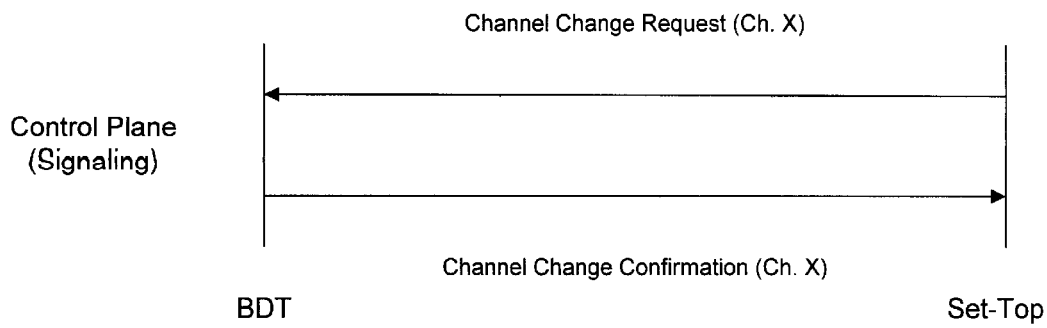
FIG. 2A illustrates the signalling control plane.

Reference is now made to the signaling control plane of FIG. 2A, which illustrates the initial transmission of the control signals between the set-top unit 19 and the BDT 12 when a subscriber makes a request for a change of channel to channel X. The set-top unit 19 sends a request for channel change to channel X to the BDT 12 over the broadband access system as illustrated by the control plane in FIG. 2A. After receiving the request from the set-top unit 19, the BDT 12 must then determine if it is a proper request and, if proper, acknowledge the set top unit 19 with a confirmation signal sent over the access system. (See FIG. 2A again.) When the BDT synchronizes with channel X, it must then direct the corresponding video data downstream to the appropriate set top unit 19 as illustrated by the user/service plane of FIG. 2B.

Figure 2B:
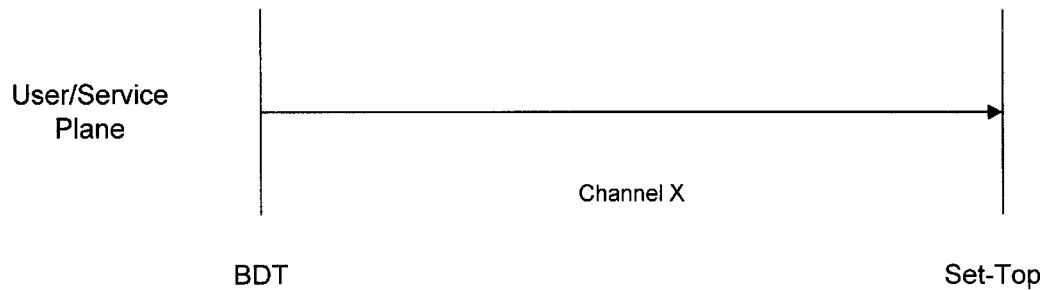
FIG. 2B illustrates the user/service control plane.

Although the illustrations of FIGS. 2A and 2B of the signal transmissions over the broadband access system show the relative travel of, and number of, signals being transmitted between a single set-top unit and a BDT 12, one must refer back to FIG. 1 to fully appreciate the time delay incurred in a "typical" channel change request. First, the subscriber must communicate his request to change to new channel X to the set-top unit 19; this is usually done through the use of a common infrared remote control. The request for channel X must travel upstream from the set-top unit 19 to the BIU 15. The control signal must be received by the BIU and passed to the BNU 14. The BNU 14 bundles all of the received control signals from the multiple set-top units it serves and transmits them to the BDT. The BDT 12, under control of the EMS 13, must determine if the channel change request is valid and if that particular subscriber has paid for the requested service.

If these first two criteria are met, the BDT will acknowledge receipt of the change of channel request. This is done through the BDT 12, under control of the EMS 13, by generating a confirmation signal to change to channel X back down the fiber optic cable to the BNU 14. The BNU 14 then directs the confirmation signal to the appropriate set-top unit. Meanwhile, the BDT 12 must then synchronize with channel X as it is received from the ATM network. Channel X is decompressed, and then multiplexed with the other video signals corresponding to the channels requested by the various other subscribers. Once BNU 14 receives the multiplexed signal, it is demultiplexed and the appropriate signal is directed to the set-top units of the appropriate requesting subscribers.

Although the change of channel appears to be straightforward, not insignificant delays force the subscriber to wait for the requested channel before it is actually viewable on the television set. A portion of the delay is caused by the fact that the BDT is located miles away from each subscriber. Since all channels are not delivered to the subscriber's set-top unit simultaneously, it takes time for the control signals and the information to traverse the distance between the set-top and the BDT 12.

Another portion of the delay is caused by the synchronization method utilized by the BDT 12 to synchronize with the signals received from the ATM network 26. The Asynchronous Transfer Mode (ATM) network was designed with the flexibility to meet the needs of many types of user data with a single format. The data transmitted over an ATM system can include digital video, digitized voice, computer data and transaction information (such as between an automated banking machine and a central computer) over both local and wide area networks.

Figure 3:
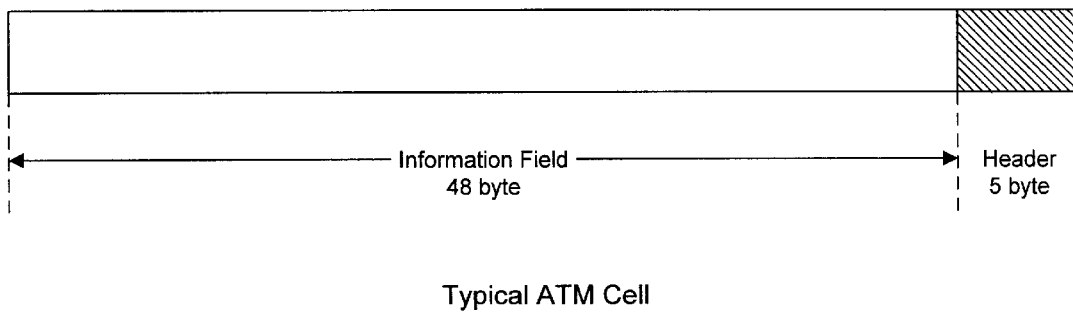
FIG. 3 shows the two major fields of an ATM cell.

The ATM format does not specify data rates or a physical channel, but calls for relatively short bit segments. Specifically, the ATM format calls for a fifty-three byte cell format, as shown in FIG. 3, which allocates five bytes for overhead and forty-eight bytes for actual data. The utilization of a short bit segment is important when the mixture of data signals include computer data. The cell format for systems that handle computer data is relatively long. This would be unacceptable for "mixed" systems that transmit "real-time" signals such as video and voice. The short cell format of the ATM systems ensures that traffic from real-time sources do not have to wait an extraordinary period of time before they can be sent between the computer data cells.

The five byte header of an ATM cell contains all of the information needed to relay the cell from one node to the next node, over a pre-established route. The video data is contained in the forty-eight byte information field.

A compression scheme is preferably utilized to pack more video data into each information field. Virtually all of the compression schemes require a starting or synchronization frame usually referred to as the Group of Picture (GOP) start point. In most compression schemes the GOP start point is found proximate the beginning of the information field as illustrated in FIG. 3.

Figure 4:
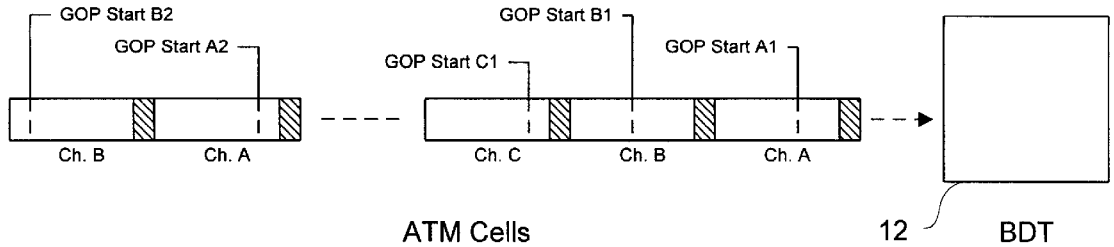
FIG. 4 illustrates a stream of ATM cells and the sequencing of a plurality of video channels and the relative location of their respective GOP frames.

After receiving the request from a subscriber to change to a new channel, the BDT 12 must then wait for the Group of Picture (GOP) start point of the requested channel. Even if the ATM system is dedicated strictly to video, the time between GOP start points is significant. As illustrated in FIG. 4, the time delay between $GOP_{B1}$ and $GOP_{B2}$ may be ½ second or more depending on the compression scheme and other factors.

After the BDT 12 synchronizes with the appropriate GOP start point, it can then decompress the requested signal and direct it to the subscriber(s) who have requested it. The signal corresponding to the requested channels is then multiplexed with the signals corresponding to the requested channel of all other subscribers handled by that BDT 12. The multiplexed signal is then transmitted downstream to BNU 14, where the signal is demuxed and directed to the appropriate set-top units 19.

Figure 5:
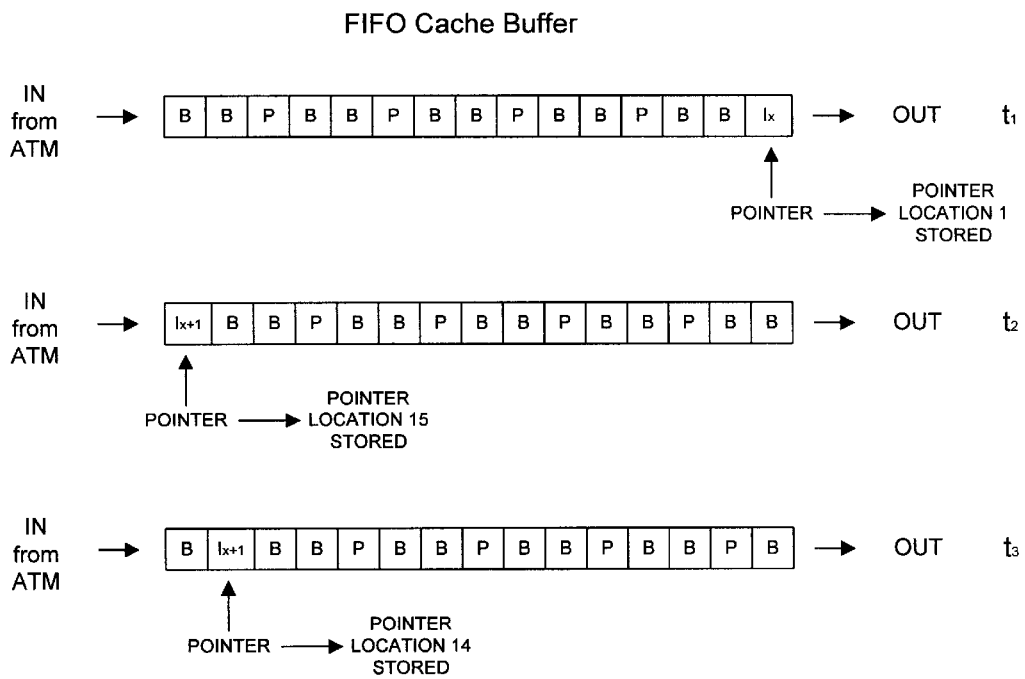
FIG. 5 illustrates the relative positions of a synchronization or I frame as it moves through a FIFO buffer for a single channel X.

In the preferred embodiment, the compressed format used to encode the video data is the Moving Pictures Experts Group 2 format, known as MPEG-2. As shown in FIG. 5, the data is transmitted as one of three basic frames. The GOP start point is coded in the "I" or intracoded frames. In addition to they frames, there are predicted frames and bidirectional frames (P and B frames, respectively). The P and B frames normally contain the video and audio content. Each synchronization frame is separated from the next synchronization frame by a pre-determined number of other frames. This predetermined number can be set to accommodate a specific requirement but in one preferred embodiment is fifteen frames.

Figure 6:
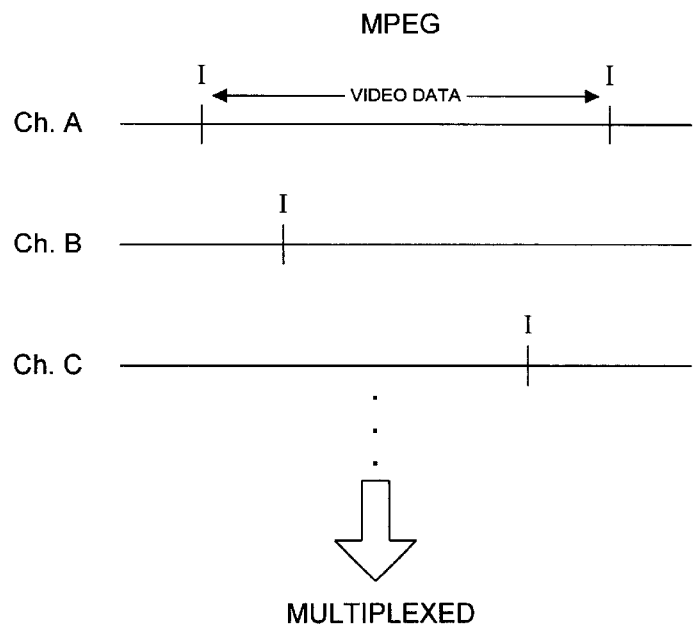
FIG. 6 illustrates a series of MPEG-2 cells for a plurality of video channels.

Referring to FIG. 6, the MPEG-2 cells comprise video data in P or B frames between synchronization or I frames. The MPEG-2 cells of a particular video channel may be transmitted in a individual ATM cell or the MPEG-2 cells of multiple video channels may be multiplexed onto an ATM cell or cells. The time between I frames under the embodiment utilizing MPEG-2 is approximately ½ second. Therefore, depending on when the BDT receives a channel change request, there can be up to a ½ second delay just for the BDT to synchronize with the I frame. Additional time must be allowed for the request to reach the BDT from the set-top, acknowledgment of the request, and eventually for transmission of the requested video signal back to the subscriber's set-top that made the request. Even though the physical distance at which the BDT is located from the set-top has some effect on the time delay a subscriber experiences between channel changes, the signals are traveling at the speed of light and cannot be made to go any faster. Constructing more BDT's closer to each subscriber is usually not economically feasible or practical. Therefore, a quicker and/or more efficient method or device to handle the incoming ATM signal is needed to reduce the overall amount of time the subscriber must wait between channel changes.

Figure 7:
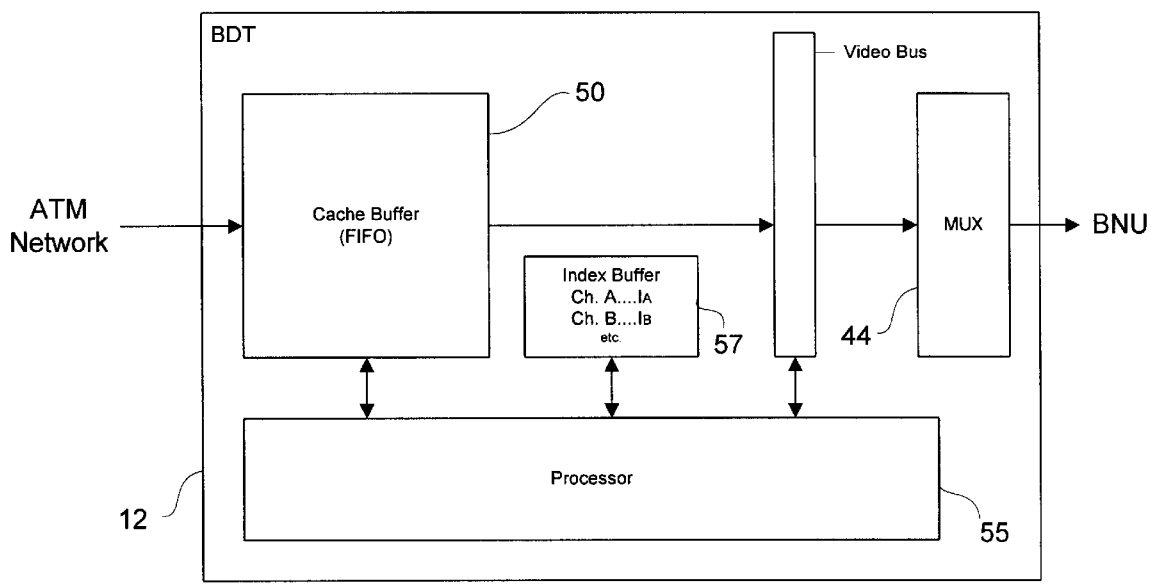
FIG. 7 is a schematic of a channel changer in accordance with the present invention.

Referring now to FIG. 7, the BDT 12 is connected to a video source (ATM network 26 or special network 32) that provide a plurality of compressed video signals. In a preferred embodiment, the compressed video signals are transmitted using the MPEG-2 format which utilizes a synchronization frame called the intracoded or "I" frame. (As explained previously, digital video delivery systems, in contrast with analog systems, require a synchronization or start frame.)

The I frame is transmitted about every ½ second in MPEG-2. Accordingly, it may take over a second between the time a subscriber requests a certain channel and can then actually view the requested channel on the television 39. The largest portion of the one second delay is caused by the wait for the video processor in the BDT to synchronize with the next available I frame. The subject rapid channel changer 10 is designed to minimize any delay between a subscriber's request to change a television channel and the actual delivery of the signal corresponding to the desired channel.

Referring again to FIG. 7, the subject invention 10 includes a first-in-first-out (FIFO) buffer 50 for storing the compressed video data of each video channel, and a processor 55 for indexing the synchronization frames. (Note that if the BDT 12 already utilizes buffers to store the video data for each channel it is supposed to receive, and a processor, the subject invention can be implemented in existing hardware, which minimizes additional costs.) The processor 55 detects the GOP start frame (or I frame in the preferred embodiment) for each channel received and establishes a pointer for each GOP start frame. The processor 55 then records the I frame pointer location for each channel in a second buffer 57.

Referring again to FIG. 5, as new video information is received into FIFO buffer 50, the previous information is counted out. The FIFO buffer 50 must hold at least the minimum number of frames in the compression scheme so that at least one GOP frame for each video channel is stored at all times in the buffer. Therefore as one I frame for channel X leaves the FIFO buffer a new I frame must enter (see FIG. 5). The processor then detects the new I frame and records the new pointer location for future reference.

In the preferred embodiment, the FIFO buffer 50 of the rapid channel changer 10 stores, at a minimum, fifteen frames (i.e., one I frame and fourteen P or B frames) for each channel that is received by the BDT. Alternatively, multiple buffer memory units may be used, e.g., one for each video channel. The processor detects each I frame as it enters the buffer and keeps track of its position as it moves through the buffer (i.e., indexing the I frame). When a subscriber's channel change request is received by the BDT, the requested signal can instantly be transmitted downstream to the subscriber since the processor 55 is always "pointing" to an I frame for each respective channel. Accordingly, the largest portion of the channel changing delay—up to a ½ second that the processor had to wait for the next synchronization frame—is eliminated.

Referring again to FIG. 7, when a change of channel request reaches BDT 12, the processor can immediately look up the location of the I frame from the pointer location buffer 57 and immediately access the appropriate video data. The BDT then sends a stream of data from the FIFO buffer 50 to a multiplexer 44 to generate a multiplexed signal for transmission to BNU 14.

A FIFO buffer 50 for each compressed video signal is desirable. In a typical example, a subscriber may have forty channels from which to choose; therefore, forty channels may be sent from the ATM network 26 to the BDT 12. Accordingly, forty FIFO buffers 50 will be used for this example of the rapid channel changer 10.

There only needs to be one pointer buffer 57 since it only stores the pointer locations of the forty GOP frames. A single processor can easily keep track of forty buffer locations and, in fact, the processor can index many more I frames. Accordingly, it may be desirable for the FIFO buffer to store two or more synchronization frames per video signal (i.e., each buffer stores at least thirty frames in the aforementioned MPEG-2 embodiment utilizing fifteen frames in each cell). In this manner, the BDT 12 can direct different channel requests to thousands of subscribers regardless of the actual location of the synch frame on any broadcast video signal.

When a subscriber decides to change the channel on his TV, a signal is sent to the set-top unit 19 and travels upstream through the BNU 14 to the BDT 12. If, for example, the subscriber wishes to change TV channels to the one corresponding with video channel X, the I frame of buffer 50 is accessed by microprocessor 55. At time $t_1$, as shown in FIG. 5, the processor 55 has stored the information corresponding to intracoded frame $I_x$. At a later time $t_2$, the processor 55 stores the position of the next intracoded frame $I_{x+1}$. As $I_{x+1}$ moves through buffer 50, the processor 55 keeps continuous track of the I frame. Accordingly, the processor 55 can immediately synchronize with the video signal stored in the FIFO buffer 50. Since the processor 55 can immediately synchronize with the video signal, it can substantially simultaneously direct the desired video data from FIFO buffer 50 to the multiplexer 44 for eventual transmission downstream to the subscriber.

In a preferred embodiment, the BDT may also determine whether the requested channel is already being transmitted to the requesting BNU. If so, there may be no need to transmit an additional signal with the same video channel information. The BNU will replicate the signal and send it to the second requesting subscriber.

Although this invention has been illustrated by reference to specific embodiments, it will be apparent to those skilled in the art that various changes and modifications may be made which clearly fall within the scope of the invention. For example, in an alternative embodiment, the video channel buffers and processor may be located in BNU 14, if desired. The invention is intended to be protected broadly within the spirit and scope of the appended claims.

What is claimed is:

1. A method of switching to a video channel requested by a subscriber in a switched digital video system, said method comprising:

inputting video data corresponding to a plurality of video channels into a first memory means, the video data including a continuous stream of a predetermined number of consecutive data frames, wherein one of the stored data frames is a synchronization start point;

detecting a location of the synchronization sort point stored in the first memory means for each input video channel recording the locations of the detected synchronization start points in a second memory means;

receiving a request for a video channel from a subscriber;

accessing the continuous stream of video data corresponding to the requested video channel at the synchronization start point location recorded in the second memory means; and transmitting the accessed continuous stream of video data corresponding to the requested channel to the requesting subscriber;

wherein the fist memory means is a "first-in-first-out" type cache buffer.

2. The method of claim 1 wherein the video data is in an MPEG-2 format.

3. The method of claim 1 wherein the accessed stream of video data is multiplexed with other video streams for transmission to a plurality of subscribers.

4. The method of claim 1 wherein, after receiving the video channel request, the method further comprises the step of acknowledging said request.

5. A channel changer for use in a switched digital video system, the digital video system receiving video data corresponding to a plurality of video channels, the channel changer comprising:

means for storing the video data, the video data including a continuous stream of a predetermined number of consecutive data frames, wherein one of the stored data frames is a synchronization frame;

means for indexing the stored synchronization frame and another synchronization frame included in video data of at least one other vide signal;

means for accessing the continuous stream of video data at the synchronization frame; and means for transmitting the accessed continuous stream of video data to a requesting subscriber, wherein the means for storing is a video-data buffer memory, wherein the means for indexing is a processor and wherein a means for storing the current location of the synchronization-frame is a synchronization-frame buffer memory.

6. The channel changer of claim 5 wherein the received video data is in a compressed format.

7. The channel changer of claim 5 wherein the received video data is in MPEG2 format and the synchronization frame is an intracoded frame.

8. The channel changer of claim 5 wherein the buffer memory is a "first-in-first-out" type buffer memory.

9. The channel changer of claim 5 further comprising:

means for receiving a request for video data from the subscriber; and means for acknowledging the request.

10. The channel changer of claim 5 wherein the digital video system comprises a broadband digital terminal (BDT) for receiving the video data.

11. The channel changer of claim 5 wherein the digital video system comprises a broadband network unit (BNU) for directing the video data to a plurality of subscribers.

12. A method of switching to a video channel requested by a subscriber in a switched digital video system, said method comprising:

inputting video data corresponding to a plurality of video channels into a buffer memory, the video data including a continuous stream of a predetermined number of consecutive data frames, wherein one of the stored data frames is a synchronization start point;

detecting a location of the synchronization start point stored in the buffer memory for each input video channel recording the locations of the detected synchronization start points in a memory receiving a request for a video channel from a subscriber;

accessing the continuous stream of video data corresponding to the requested video channel at the synchronization start point location recorded in the memory means; and transmitting the accessed continuous stream of video data corresponding to the requested channel to the requesting subscriber.

* * * * *